United States Patent [19]

Murase et al.

[11] Patent Number: 4,840,251
[45] Date of Patent: Jun. 20, 1989

[54] NOISE REDUCING APPARATUS

[75] Inventors: Masanori Murase, Kodaira; Naotaka Tomita, Sayama; Kazuyoshi Iida, Yokohama, all of Japan

[73] Assignee: Bridgestone Corporation, Japan

[21] Appl. No.: 251,290

[22] Filed: Sep. 30, 1988

[30] Foreign Application Priority Data

Sep. 30, 1987 [JP] Japan .................................. 62-247349

[51] Int. Cl.⁴ ............................................... F01N 1/06
[52] U.S. Cl. ..................................... 181/206; 181/200; 181/202; 181/204; 181/286; 181/288
[58] Field of Search ............... 181/175, 176, 206, 286, 181/288, 200, 202, 204, 210

[56] References Cited

U.S. PATENT DOCUMENTS

| 4,156,476 | 5/1979 | Matsumoto et al. | 181/210 |
| 4,158,401 | 6/1979 | Watsumoto et al. | 181/210 |
| 4,753,318 | 6/1988 | Mizuno et al. | 181/206 X |

Primary Examiner—B. R. Fuller
Attorney, Agent, or Firm—Sughrue, Mion, Zinn, Macpeak & Seas

[57] ABSTRACT

A noise reducing apparatus in the form of a hollow body comprising two or more passage groups consisting of a plurality of passages. The length of each passage is determined such that the sound waves emitted from the passages of the adjacent passage groups form plane waves which are shifted by a half wavelength so that plane waves interfere each other. The apparatus can be secured to an opening of construction and reduce the level of sound pressure from a sound source without any closed shield construction surrounding the sound source.

3 Claims, 6 Drawing Sheets

FIG_1
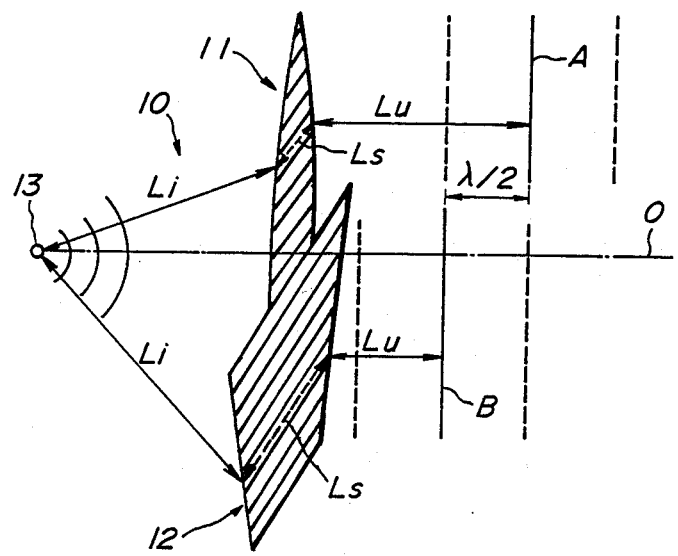
FIG_2
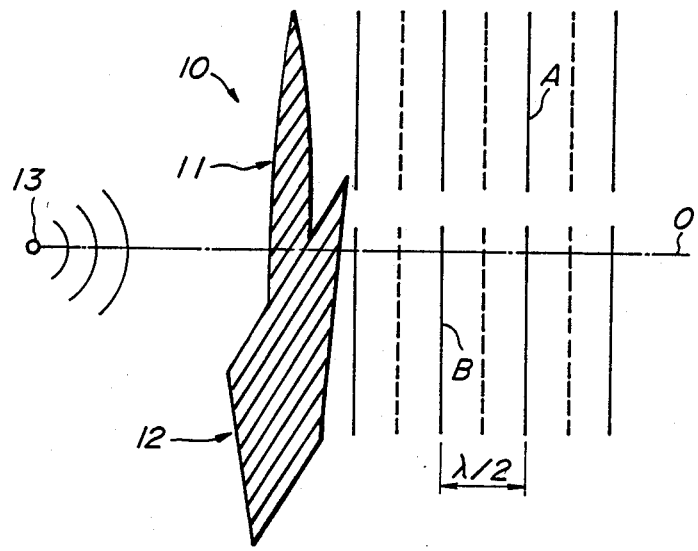

FIG._3
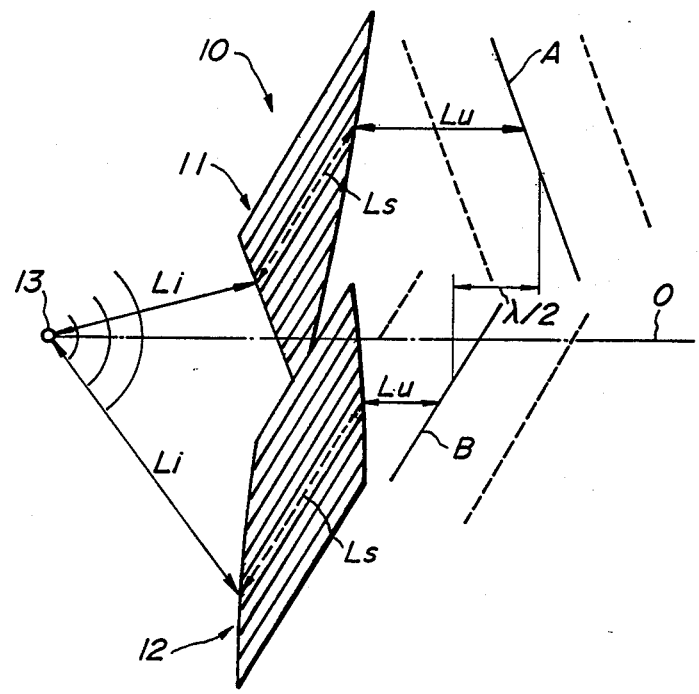
FIG._4
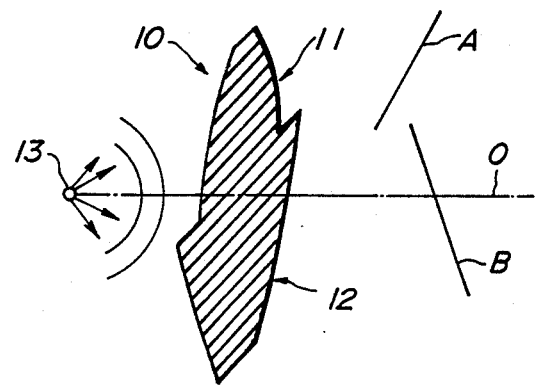

FIG_5
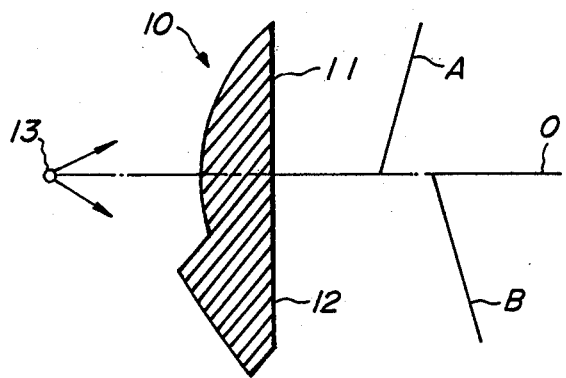
FIG_6
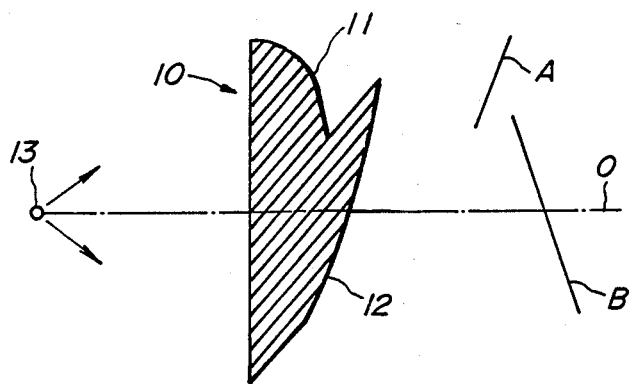

FIG_7
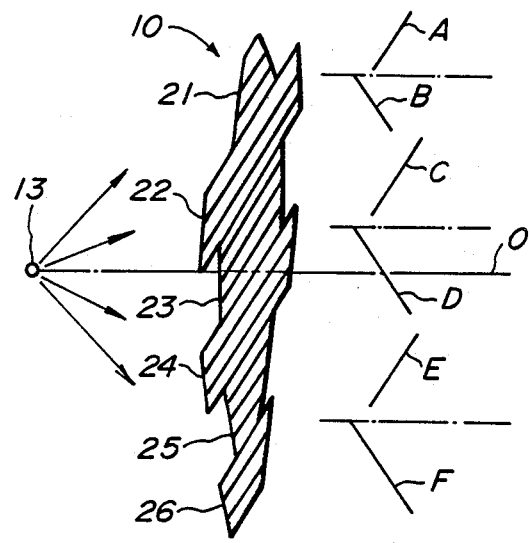
FIG.8
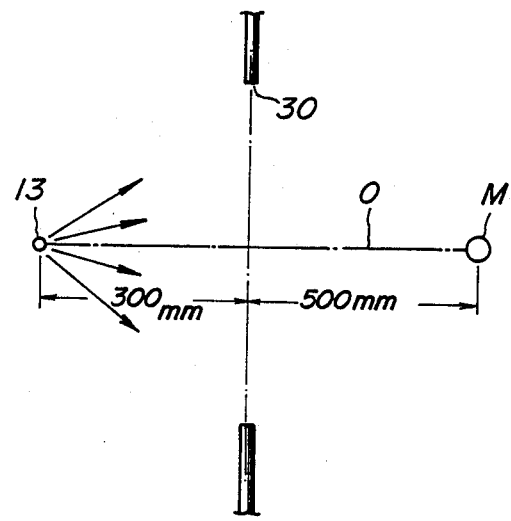

FIG_9
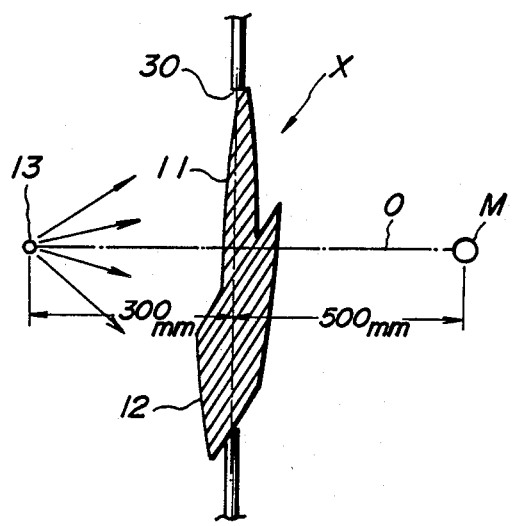
FIG_10
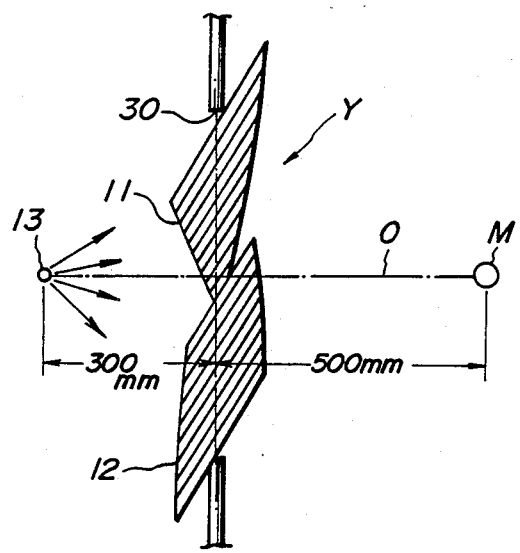

FIG_11
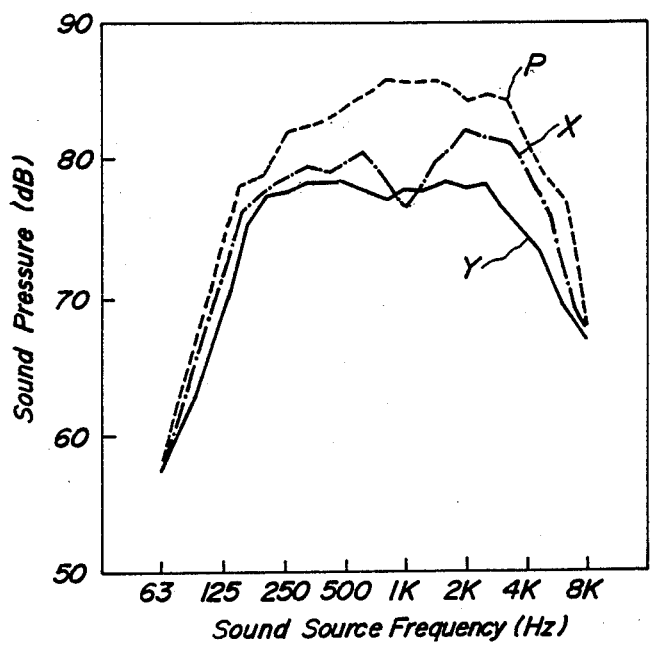
FIG_12
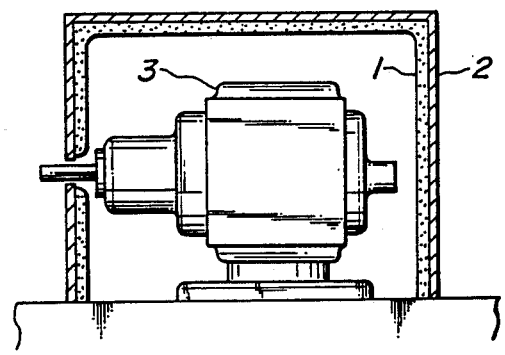

NOISE REDUCING APPARATUS

BACKGROUND OF THE INVENTION

1. Field of the Invention

The invention relates to a noise reducing apparatus, particularly to a noise reducing apparatus comprising an interfering type hollow body for reducing noise by interfering an incident sound from a sound source.

2. Related Art Statement

Hitherto, the level of noise radiated from a sound source is generally reduced by absorbing and insulating the noise in such a manner as shown in FIG. 12 wherein the sound source 3 such as an electric motor is surrounded by a shield construction 2 provided with a sound absorbing materials 1 on the inner wall thereof.

However, such a conventional sound absorbing shield construction as shown in FIG. 12 has a disadvantage that since actual sound sources such as vehicle engines and electric motors generate heat as well as noise a the same time, the sound absorbing material and the shield construction are required to have a sufficient thermal resistance and the engine and the motor tend get troubles so that the security can not be maintained since the radiation of heat is avoided owing to the closed shield construction.

SUMMARY OF THE INVENTION

An object of the invention is to provide a noise reducing apparatus comprising a hollow body consisting of a plurality of inclined hollow tubular passages having a noise reducing effect by interference of sound waves when placed at an opening in the wall surrounding a sound source, without use of the closed shield construction.

According to the present invention, the sound reducing apparatus in the form of a hollow body comprises a first group of passages and a second group of passages, each passage of the first group is determined such that a sum of a distance from a sound source to the inlet of a passage, the length of the passage and a distance from the outlet of the passage to an imaginary flat plane in front of the outlet of the passage is a constant "LA" so that the resultant wave emitted from the outlet after passing through each passage of the first group of the passages becomes a plane wave and a length of each passage of the second group is determined such that a constant "LB" which is equal to said constant "LA" plus or minus a half wavelength of a frequency of a sound to be reduced is maintained.

BRIEF DESCRIPTION OF THE DRAWINGS

FIG. 1 is a schematic cross-sectional view of a first noise reducing apparatus according to the invention;

FIG. 2 is a schematic cross-sectional view illustrating a wherein the frequency of the sound source becomes multiples of even numbers in the apparatus of FIG. 1;

FIG. 3 is a schematic cross-sectional view of a second embodiment of the noise reducing apparatus according to the invention;

FIGS. 4~6 are schematic cross-sectional views of third to fifth embodiments of the noise reducing apparatus according to the invention;

FIG. 7 is a schematic cross-sectional view of a sixth embodiment comprising divided six groups of the noise reducing apparatus according to the invention;

FIGS. 8~10 are schematic cross-sectional views illustrating each of various conditions of tests for confirming the noise reducing effect by the apparatus of the invention;

FIG. 11 is a graph showing the frequency characteristic of sound pressure as the result of the test carried under the conditions illustrated in FIGS. 8~10; and FIG. 12 is a schematic cross-sectional view of a prior noise reducing apparatus.

DESCRIPTION OF THE PREFERRED EMBODIMENTS

The present invention will be more fully described with reference to FIGS. 1~11.

Referring to FIG. 1 illustrating the first embodiment of the invention, a noise reducing apparatus 10 in the form of a hollow body comprises a first passage group 11 consisting of a plurality of passages 11-1, 11-2, . . . 11-n and a second passage group 12 consisting of a plurality of passages 12-1, 12-2, . . . 12-n.

Each of passages 11-1, 11-2, . . . 11-n, 12-1, 12-2, . . . 12-n is inclined at an angle with respect to the horizontal as shown in the drawings. The passages may be provided in the form of a blind having slits of a constant width formed in the hollow body 10, or may be arranged in various manners such as a concentric circle shape or a concentric ellipse shape corresponding to the shape and size of a sound source 13.

The noise reducing apparatus 10 can reduce the level of noise from the sound source 13 by mutual interference of sound waves passed through the passages.

The length of each passage 11-i (i=1, 2 . . . n) of the first passage group 11 is determined such that a sum of a distance "Li" from a sound source 13 to the inlet of the passage, the length "Ls" of the passage and the distance "Ln" from the outlet of the passage to an imaginary flat plane (plane wave) "A" in front of the outlet of the passage is a constant "LA" so that the resultant wave emitted from the outlet after passing through the passages of the first passage group becomes a plane wave "A".

On the other hand, the length of each passage 12-1 (i=1, 2 . . . n) of the second passage group 12 is selected such that the sum of a distance "Li" from the sound source 13 to the inlet of the passage, the length "Ls" of the passage and a distance "Lu" from the outlet of the passage to an imaginated flat plane (plane wave) "B" at the front of the outlet of the passage is a constant "LB" and is equal to said constant "LA" plus or minus a half wavelength $\lambda/2$ of a frequency of a sound to be reduced so that the resultant wave emitted from the outlet after passing through each passage 12-i becomes a plane wave "B" which is shifted from the plane wave "A" by a half wavelength $\lambda/2$.

According to the noise reducing apparatus mentioned above, a sound wave which is spherically emitted from a spot sound source 13 such as a vehicle engine, an electric motor and the like, passes through the passages of the upper and lower passage groups 11 and 12 of the hollow body to form two plane waves "A" and "B" which are shifted to each other by a half wavelength ($\frac{1}{2}\lambda$). Those shifted two plane waves advance in a direction parallel to the center axis "0" of the hollow body.

In FIG. 1, the plane waves are illustrated by solid lines and broken lines which are spaced from each other by a distance $\lambda/2$ in the direction parallel to the center axis of the hollow body and extended in the direction at right angles to the center axis. The solid lines represent the crest of the sound wave, while the broken lines represent the trough. Therefore, in the vicinity of the boundary of the plane waves "A" and "B", both the sound waves having phases different from each other by a half wavelength $\lambda/2$ are mixed with each other to overlap the crests and troughs of the two different sound waves.

As the result, a destructive interference occurs to generate a noise reduction zone in the vicinity of the frequency to be reduced.

The embodiment mentioned above with reference to FIG. 1 provides a noise reducing apparatus having a noise reducing effect caused by the interference of the sound waves when the apparatus is placed at an opening in a side wall around the sound source without use of any closed shield construction.

When mutually parallel two plane waves "A" and "B" as shown in FIG. 1 interfere each other, a remarkable noise reducing effect can be obtained at the frequency to be reduced, but at a frequency which is even number multiples of the frequency to be reduced, the broken line representing the trough of sound wave of the frequency to be reduced becomes the crest so that the overlapped portions of the adjacent plane waves become in-phase. As the result, the interference does not occur and, on the contrary, the level of sound pressure is increased.

FIG. 2 shows a situation in which the upper and lower plane waves "A" and "B" having a frequency which is two times the frequency of the sound to be reduced become in-phase in the noise reducing apparatus shown in FIG. 1.

In order to prevent the components of frequency, which are even number multiples of the frequency to be reduced, from increasing the level of the sound pressure, it can be thought that the upper and lower plane waves "A" and "B" which are emitted from the passages are directed to incline to each other so that the phenomenon of interference is secured.

FIG. 3 shows a second embodiment of the noise reducing apparatus according to the invention.

Referring to FIG. 3, the noise reducing apparatus 10 in the form of a hollow body comprises a first passage group 11 consisting of a plurality of passages 11-i and a second passage group 12 consisting of a plurality of passages 12-i. The length "Ls" of each passage 11-i of the first passage group 11 is determined such that a sum $(Li+Ls+Lu)$ of a distance "Li" from a sound source 13 to the inlet of the passage, the length "Ls" of the passage and a distance "Lu" from the outlet of the passage to an imaginated flat plane "A" in front of the outlet of the passage is constant, and the resultant wave plane "A" of the sound waves emitted from the outlet after passing through passages 11-i of the first passage group 11 becomes a plane wave. Further, the length "Ls" of each passage 12-i of the second passage group 12 is determined so as to maintain a constant "LB" which is equal to said constant "LA" plus or minus a half wavelength $\lambda/2$ of a frequency of a sound to be reduced. This basic conception is the same as that of the first embodiment in FIG. 1.

However, in the noise reducing apparatus 10 shown in FIG. 3, the constant distances "LA" and "LB" from the sound source 13 to the respective upper and lower resultant wave planes "A" and "B" are constantly maintained, respectively, while the distances "Lu" from the outlet of each passage 11-i, 12-i to the imaginary flat plane "A" and "B" are gradually increased or decreased at a constant rate as the position of the passage come to the center from the upper or lower end of the hollow body so that the plane waves "A" and "B" are inclined to each other.

The length "Ls" of each passage 11-i and 12-i is determined so as to incline the plane waves "A" and "B" to each other at a predetermined angle.

In the noise reducing apparatus 10 of the invention, the hollow body consisting of a plurality of inclined passages 11-i and 12-i has an incident surface opening to the sound source 13 and the emitting surface on the opposite side. Both of these surfaces may be curved surfaces or one of the surfaces may be a plane surface and the other may be a curved surface.

In the above mentioned embodiment of to FIG. 3, a part of sound waves propagated from the left side of the hollow body 10 passes through the passages of the first passage group 11 and the second passage group 12, accompanying a phase shift as a result of the difference in the distance propagated from the sound source 13. The plane waves "A" and "B" in respective resultant wave planes are shifted to each other by a half wavelength $\lambda/2$ of the frequency of the sound to be reduced and are opposed at a predetermined angle, preferably more than 5° independent to the inclined angle with respect to the center axis "0" of the hollow body 10.

When two plane waves "A" and "B" are formed parallel to each other as shown in FIG. 1, a linear interfere phenomenon can generate, but when the plane waves "A" and "B" incline to each other as shown in FIG. 3, a spot interfere phenomenon generates.

Accordingly, the noise reducing apparatus shown in FIG. 3 can generate somewhat gentle interference phenomenon over a wide range of frequency in the vicinity of the boundary of both plane waves "A" and "B", but not extreme interference phenomenon at single frequency, so that a noise reducing effect is obtainable in a wide frequency range.

In the embodiment shown in FIG. 3, the plane waves "A" and "B" emitted from the passages of the first and second passage groups 11 and 12 incline in a direction away from the other plane wave, but the direction of inclination may be reversed.

The shape of the incident and emission surfaces of the hollow body 10 including passages 11-i and 12-i is not limited to the flat or curved shape as shown in FIG. 3, but may be different shapes.

FIG. 4 shows an embodiment wherein the resultant wave planes "A" and "B" after passing the hollow body 10 incline in a direction opposite to the case of FIG. 3 so that the wave planes come towards each other as the sound waves progress.

FIG. 5 shows an embodiment wherein the hollow body 10 has extensions of the passages 11-i and 12-i at the incident side and a vertical flat surface at the emission side.

FIG. 6 shows an embodiment wherein the hollow body 10 has a converted shape of that of FIG. 5, i.e. the hollow body 10 has extensions of the passages 11-i and 12-i at the emission side and a vertical flat surface at the incident side.

Each embodiment of the noise reducing apparatus according to the invention shown in FIGS. 4~6 differs from the embodiment shown in FIG. 3 in the above mentioned portions, but the remaining portions have substantially the same construction as that of the embodiment shown in FIG. 3. Therefore, same reference numerals are used for the corresponding parts and their detailed explanations are omitted.

Each embodiment of FIGS. 4~6 accomplishes the same function and effect as that of the embodiment of FIG. 3.

FIG. 7 shows an embodiment wherein the hollow body 10 comprises six passage groups 21, 22, 23, 24, 25 and 26, each of which is consisting of a plurality of inclined passages.

The noise reducing apparatus 10 shown in FIG. 7, a set of the adjacent passage groups for example, passage groups 21 and 22 or passage groups 22 and 23 has substantially the same construction as that of either of embodiments shown in FIGS. 3~6.

Accordingly, in the embodiment shown in FIG. 7, the resultant wave planes which are emitted from six passage groups, respectively, form plane waves A, B, C, D, E and F between adjacent wave planes. These plane waves are inclined to each other and are shifted by a half wavelength of frequency of sound to be reduced so that the noise reducing effect owe to the interference of sound waves is obtainable in a wide range of frequency.

The noise reducing apparatus having a hollow body comprising six passage groups is shown in FIG. 7, but the hollow body may comprises three, four, five or more than six passage groups.

Referring to FIGS. 8~11, tests for confirming an effect of the noise reducing apparatus according to the invention will be described.

In the tests, as shown in FIGS. 8~10 the sound was propagated through an opening 30 at a position spaced 300 mm from a spot sound source 13 and the level of the sound pressure was measured by a mike M set at a position spaced 500 nm from the opening 30 in the opposite direction.

FIG. 8 shows a condition of a comparative test wherein any noise reducing apparatus is not used so that the sound directly passes through the opening 30.

FIG. 9 shows a test condition of an embodiment "X" of the noise reducing apparatus secured to the opening 30, wherein 1 KHz sound passing through the upper and lower passage groups 11 and 12 forms plane waves parallel to each other.

FIG. 10 shows a test condition of an embodiment "Y" secured to the opening 30, wherein 1 KHz sound passing through the upper and lower passage groups 11 and 12 forms plane waves inclined to each other.

In the tests shown in FIGS. 9 and 10, the mike M is set on the center axis "0" of each of the hollow bodies "X" and "Y", and in the test shown in FIG. 8 the mike is also set at the same position as that of FIGS. 9 and 10.

In the tests, the variation of level of sound pressure at the mike "M" is measured as the frequency of the spot sound source 13 is varied.

FIG. 11 shows the results of the above mentioned tests.

In FIG. 11, a curve "P" represents the level of sound pressure measured in the test shown in FIG. 8, a curve "X" represents the level of sound pressure measured in the test with the noise reducing apparatus "X" of the invention shown in FIG. 9 and a curve "Y" represents the level of sound pressure measured in the test with the noise reducing apparatus "Y" of the invention shown in FIG. 10.

As apparent from the graph of FIG. 11, the noise reducing apparatus "X" corresponding to the embodiment shown in FIG. 1 shows a remarkable noise reducing effect to the noise of frequency 1 KHz to be reduced and the noise reducing apparatus Y corresponding to the embodiments shown in FIGS. 3~6 shows a remarkable noise reducing effect over a wide range of frequency.

As described above, the noise reducing apparatus according to the invention wherein noise spherically emitted from the sound source is passed through passages of two or more passage groups in the hollow body to form plane waves which are shifted by a half wavelength and furthermore to slope the plane waves to each other, if necessary, can effectively reduce the rise from the sound source by interfering between the plane waves without the closed shield construction surrounding the sound source.

What is claimed is:

1. A noise reducing apparatus in a form of a hollow body comprising a first group of passages and a second group of passages, a length of each passage of the first group is determined as a sum of; a distance from a sound source to an inlet of a passage, the length of the passage and a distance from an outlet of the passage to an imaginary flat plane in front of the outlet of the passage to achieve a first constant length so that a resultant wave emitted from the outlet after passing through each passage of the first group of the passages becomes a plane wave, and a length of each passage of the second group is determined such that a second constant length is equal to said first constant length plus or minus a half wavelength of a frequency of a sound to be reduced so that the resultant plane wave emitted from the outlet of the passages of the first group and a resultant plane wave emitted from an outlet of the passages of the second group become a plane wave which is shifted from said imaginary flat plane by a half wavelength.

2. A noise reducing apparatus claimed in claim 1, wherein the plane waves emitted from the first passage group and the plane waves emitted from the second passage group are inclined to each other at an angle more than 5° independent to an angle with respect to a center axis of the hollow body.

3. A noise reducing apparatus claimed in claim 1 or 2 comprising three or more passage groups, the plane waves emitted from adjacent passage groups are shifted by a half wavelength of frequency of sound to be reduced respectively.

* * * * *